US006845469B2

(12) United States Patent
Hicks et al.

(10) Patent No.: US 6,845,469 B2
(45) Date of Patent: Jan. 18, 2005

(54) METHOD FOR MANAGING AN UNCORRECTABLE, UNRECOVERABLE DATA ERROR (UE) AS THE UE PASSES THROUGH A PLURALITY OF DEVICES IN A CENTRAL ELECTRONICS COMPLEX

(75) Inventors: Raymond Leslie Hicks, Rochester, MN (US); Alongkorn Kitamorn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 09/820,461

(22) Filed: Mar. 29, 2001

(65) Prior Publication Data

US 2002/0144181 A1 Oct. 3, 2002

(51) Int. Cl.[7] ............................................... G06F 11/00
(52) U.S. Cl. ........................... 714/30; 714/40; 714/43; 714/44
(58) Field of Search ............................. 714/30, 31, 40, 714/42, 43, 44

(56) References Cited

U.S. PATENT DOCUMENTS

| | | | | |
|---|---|---|---|---|
| 5,193,177 A | * | 3/1993 | Burri ........................... | 714/43 |
| 5,619,642 A | * | 4/1997 | Nielson et al. ................ | 714/6 |
| 6,000,040 A | * | 12/1999 | Culley et al. ................. | 714/31 |
| 6,003,144 A | * | 12/1999 | Olarig et al. ................. | 714/42 |
| 6,058,494 A | * | 5/2000 | Gold et al. ................... | 714/42 |
| 6,105,150 A | * | 8/2000 | Noguchi et al. .............. | 714/44 |
| 6,253,250 B1 | * | 6/2001 | Evans et al. ................ | 709/253 |
| 6,574,752 B1 | * | 6/2003 | Ahrens et al. ................ | 714/43 |

* cited by examiner

Primary Examiner—Robert Beausoliel
Assistant Examiner—Joshua Lohn
(74) Attorney, Agent, or Firm—Sawyer Law Group LLP

(57) ABSTRACT

A method and system for managing uncorrectable data error (UE) conditions as the UE passes through a plurality of devices in a central electronic complex (CEC) is disclosed. The method and system comprises detecting a UE-RE by at least one device in the CEC; and providing an attention signal by at least one device to a diagnostic system to indicate the UE-RE condition. The method and system further includes analyzing the UE-RE attention signal by the diagnostic system to produce an error log with a list of failing parts and a record of the log. A method and system in accordance with the present invention provides a new fault isolation methodology and algorithm, which extends the current capability of a service processor runtime diagnostic code (PRD). The method and system in accordance with the present invention allows for correct error isolation and for surfacing of appropriate service action messages on a processing system that has successfully recovered from an uncorrectable data error (UE) condition. The method allows for the accurate determination of an error source and provides appropriate service action if and when the system fails to recover from the UE condition.

37 Claims, 7 Drawing Sheets

METHOD FOR MANAGING AN UNCORRECTABLE, UNRECOVERABLE DATA ERROR (UE) AS THE UE PASSES THROUGH A PLURALITY OF DEVICES IN A CENTRAL ELECTRONICS COMPLEX

CROSS-REFERENCE TO RELATED APPLICATION

The present application is related to co-pending application, Ser. No. 09/820,458, filed entitled "Method and System for Fault Isolation Methodology for I/O Unrecoverable Uncorrectable Error," and assigned to IBM Corporation, Armonk, N.Y.

FIELD OF THE INVENTION

The present invention relates generally to processing systems and more particularly to a fault isolation methodology related to such systems.

BACKGROUND OF THE INVENTION

Conventional computing systems crash when they encounter uncorrectable/unrecoverable data errors (UEs). The impact to the owner of the system can range from minor nuisance to severe monetary business losses. Accordingly, a system owner is adversely affected by such system crashes and becomes very dissatisfied by these UEs. Methods to avoid such crashes have both tangible and intangible benefits.

On a conventional multiprocessing computing system platform which includes a service processor, an error classification and processing model is provided whereby the hardware within the central electronic complex notifies a service processor (SP) of conditions requiring processing. An attention signal is provided that informs the SP that such a condition has occurred. The hardware has functions that capture and inform the SP of the type of condition that has occurred. In the conventional system there are three (3) possible hardware detected error types:

1. Recovered Error Attention (REA): A hardware detected error condition which hardware itself recovered from.
2. Special Attention (SA): A hardware detected condition (not necessarily an error) that requires specific unique SP processing actions.
3. Checkstop Attention (CSA): A hardware detected error condition for which the hardware caused the system to cease operating (i.e., system crashes).

In this model a given fault or attention condition was designed to be detected and reported from one and only one logical fault source point. A UE in this model was reported as a CSA thereby causing the system hardware to crash immediately. Accordingly, it is desirable to find ways to keep systems functioning as well as possible when UE conditions are encountered. It is also desirable to provide correct fault isolation in a computer system that continues to function while such systems pass the "data with error" through multiple system components on the way to their data destination with various repercussions at each observation point. The present invention addresses such a need.

SUMMARY OF THE INVENTION

A method and system for managing uncorrectable data error (UE) conditions as the UE passes through a plurality of devices in a central electronic complex (CEC) is disclosed. The method and system comprises detecting a UE-RE by at least one device in the CEC; and providing an attention signal by at least one device to a diagnostic system to indicate the UE-RE condition. The method and system further includes analyzing the UE-RE attention signal by the diagnostic system to produce an error log with a list of failing parts and a record of the log.

A method and system in accordance with the present invention provides a new fault isolation methodology and algorithm, which extends the current capability of a service processor runtime diagnostic code (PRD). The method and system in accordance with the present invention allows for correct error isolation and for surfacing of appropriate service action messages on a processing, system that has successfully recovered from an uncorrectable data error (UE) condition. The method allows for the accurate determination of an error source and provides appropriate service action if and when the system fails to recover from the UE condition.

DETAILED DESCRIPTION

The present invention relates generally to processing systems and more particularly to a fault isolation methodology related to such systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention allows for managing uncorrectable data errors (UE) as they pass through various points within a computing system from source to destination. The method and system in accordance with the present invention allows for isolation of the error types identified below.

a. Recovered Error Attention (REA): A hardware detected error condition which the hardware itself recovered from.

b. Special Attention (SA): A hardware detected condition (not necessarily an error) that requires specific unique SP processing actions.

c. Checkstop Attention (CSA): A hardware detected error condition for which the hardware caused the system to cease operating (i.e., system crashes).
d. UE-RE: This is attention type raised at the initial detection point of uncorrectable data error. It is closest to actual physical source of error.
e. SUE (Special Uncorrectable Error)-Mask: This category is not a true attention but rather an observation of uncorrectable data passing a point (on the path from source to destination) which had been detected and reported closer to the data source and then marked as an SUE and passed along to this observation point. The reason for a mask here is that the error does not necessarily need to be (redundantly) reported from a particular observation point.
f. SUE-Interrupt: This category is not a true attention to SP but rather an interrupt to the system processor generated in the event the passed error data gets used. This is a hardware mechanism used to invoke system error handling code.
g. SUE-CS: This is an attention to SP which signifies that a particular SUE condition has been detected from which system recovery is not feasible.

The new error conditions (UE-RE, SUE-mask, SUE-Interrupt and SUE-CS) allow fault isolation of detected UE conditions and provide the system with an opportunity to continue operations without crashing. The SP's runtime diagnostic code (known as PRD) processes all of the above seven conditions except the SUE-Interrupt. To describe the features of the invention in more detail refer now to the following description in conjunction with the accompanying figures.

Figure 1:
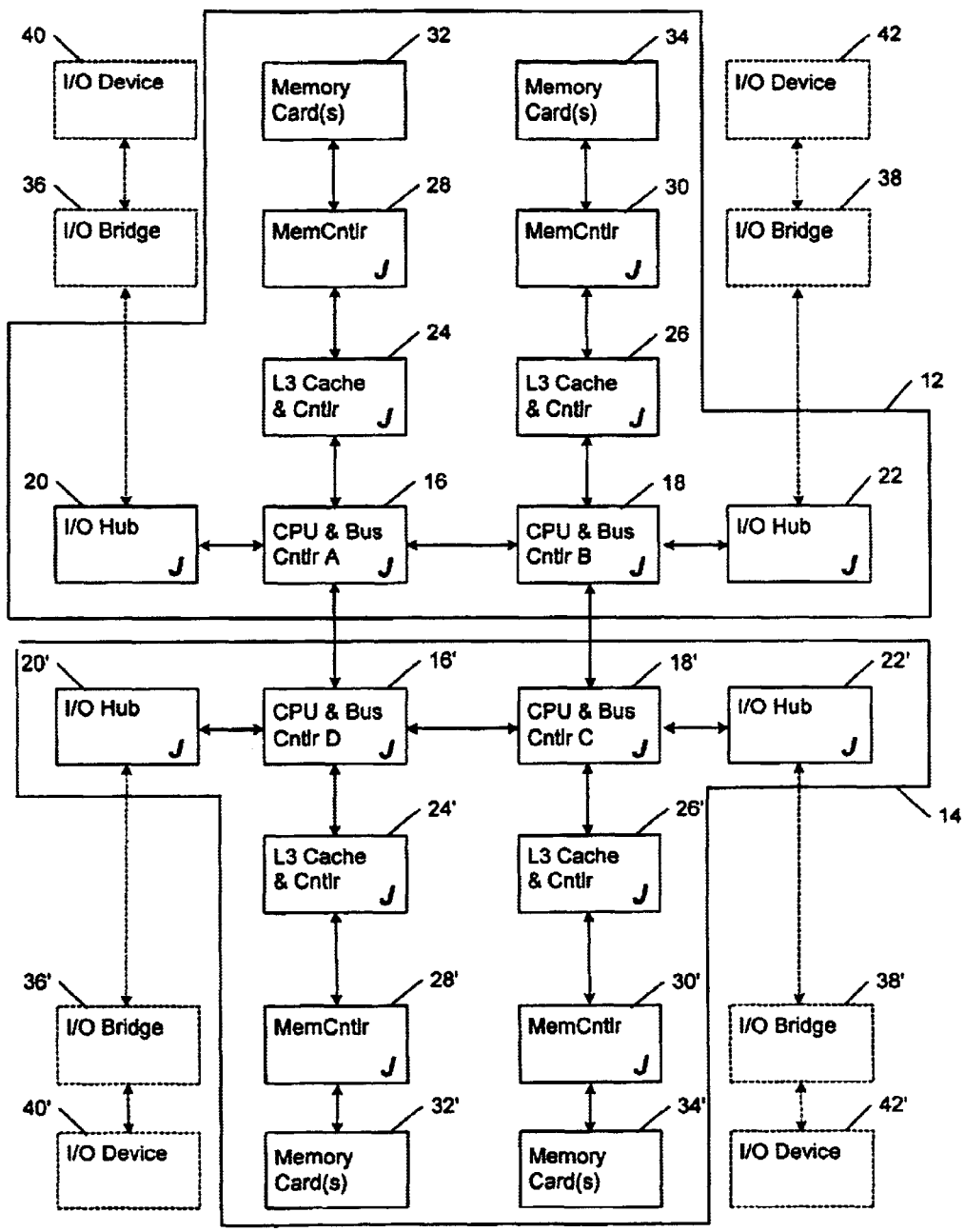
FIG. 1 is a simple block diagram of the main components for a central electronic complex.

FIG. 1 is a simple block diagram of the main components for a central electronic complex (CEC) 10. Solid lines indicate entities and connections within the central electronics complex. Dotted lines indicate remote entities and connections between them and to the CEC 10. A system and method in accordance with the present invention can be utilized with many types of CEC structures. The structures can be simpler than those which are shown in FIG. 1 or the structures can be more complex. An example of a simple structure could be removing the CPU/bus controller 18, I/O hub 22, L3 cache/controller 26, memory controller 30 and memory card 34 and providing a link to a simple "pass through" connecting component between and connected to both CPU/bus controller 16 and to CPU/bus controller 18'. An example of a more complex structure would consist of providing multiple replicates of CEC devices shown in FIG. 1 with the CPU/Bus Controller units in each replicate interconnected with the respective CPU/Bus controller in other replicates. All such configurations are single processing systems which can operate as a single operating system image or as a logically partitioned multiple OS image complex.

Furthermore, although this embodiment of a CEC 10 illustrates one of the possible CEC configurations, one of ordinary skill in the art recognizes that any number of CEC configurations could be utilized therewithin and that would be within the spirit and scope of the present invention.

Each of the CPU/bus controllers 16, 18, 18' and 16' are connected in communication with their own I/O hubs 20, 22, 22' and 20' respectively. Furthermore, each CPU/bus controller 16, 18, 18' and 16' is in communication with their respective L3 cache/controllers 24, 26, 26' and 24'. The L3 cache/controllers 24, 26, 26' and 24' in turn are in communication with their respective memory controllers 28, 30, 30' and 28'. The memory controllers 28, 30, 30' and 28' are in turn in communication with memory cards 32, 34, 34' and 32'. The I/O hubs 20, 22, 22' and 20' are also in communication with I/O bridge devices 36, 38, 38' and 36' and I/O devices 40, 42, 42' and 40' which are shown with dotted lines to indicate that they are not part of the overall CEC 10. Each of the devices within the CEC includes a JTAG connection indicated by the letter "J" to a service processor (not shown).

Figure 2:
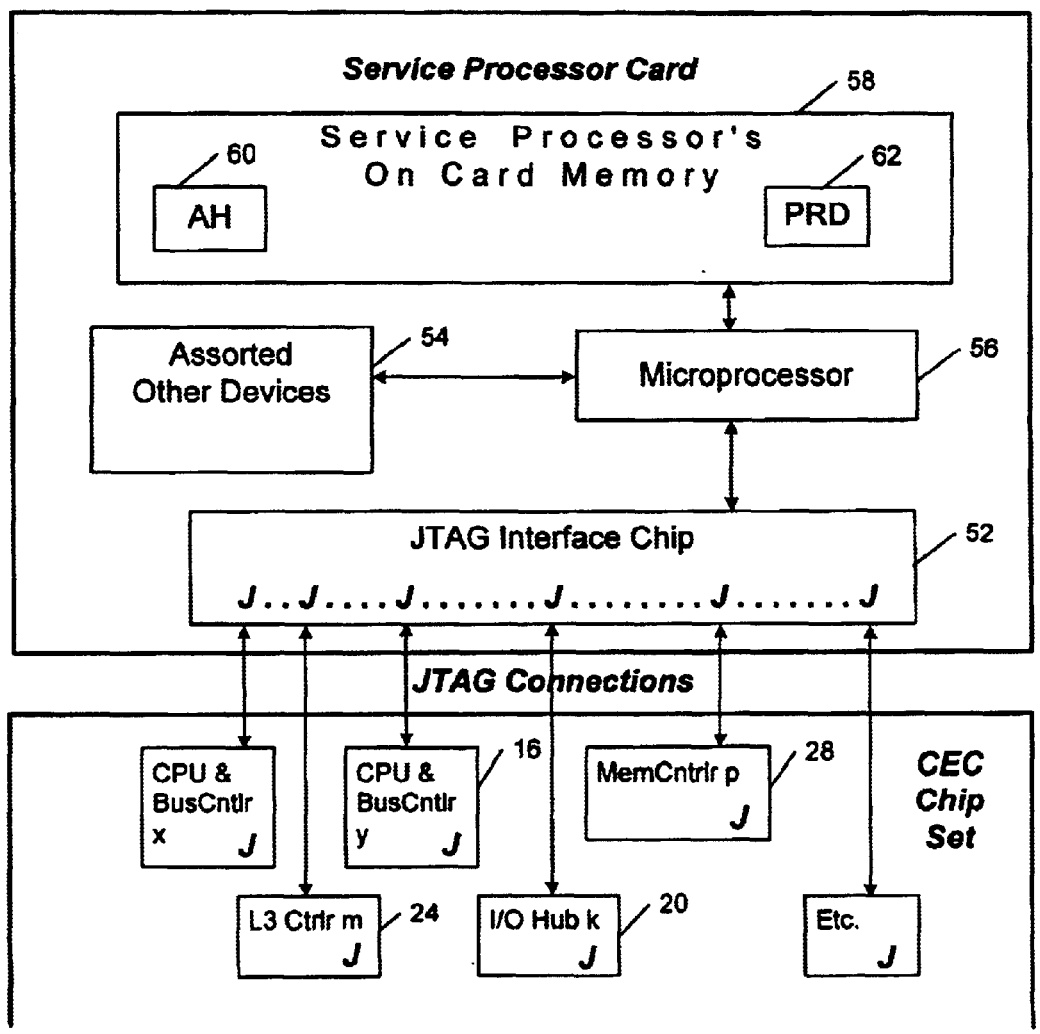
FIG. 2 illustrates a service processor, which has a JTAG interface device therewith which communicates with the various components of the CEC.

FIG. 2 illustrates a service processor 50, which has a JTAG interface device 52 therewith which communicates with the various components of the CEC 10. Each of the devices within the CEC 10 includes an attention line to alert the service processor 50 to a condition requiring service processor action. The attention handler 60 and service processor runtime diagnostics (PRD) 62 related to that attention handler are firmware components that run on the service processor's microprocessor 56.

A method and system in accordance with the present invention provides a new fault isolation methodology and algorithm, which extends the current capability of the PRD 62. The method and system in accordance with the present invention allows for correct error isolation and for surfacing of appropriate service action messages on a processing system that has successfully recovered from a UE condition. The method allows for the accurate determination of an error source and provides appropriate service action if and when the system fails to recover from the UE condition. To describe the features of the present invention in more detail refer now to the following description in conjunction with the accompanying figures.

Figure 3:
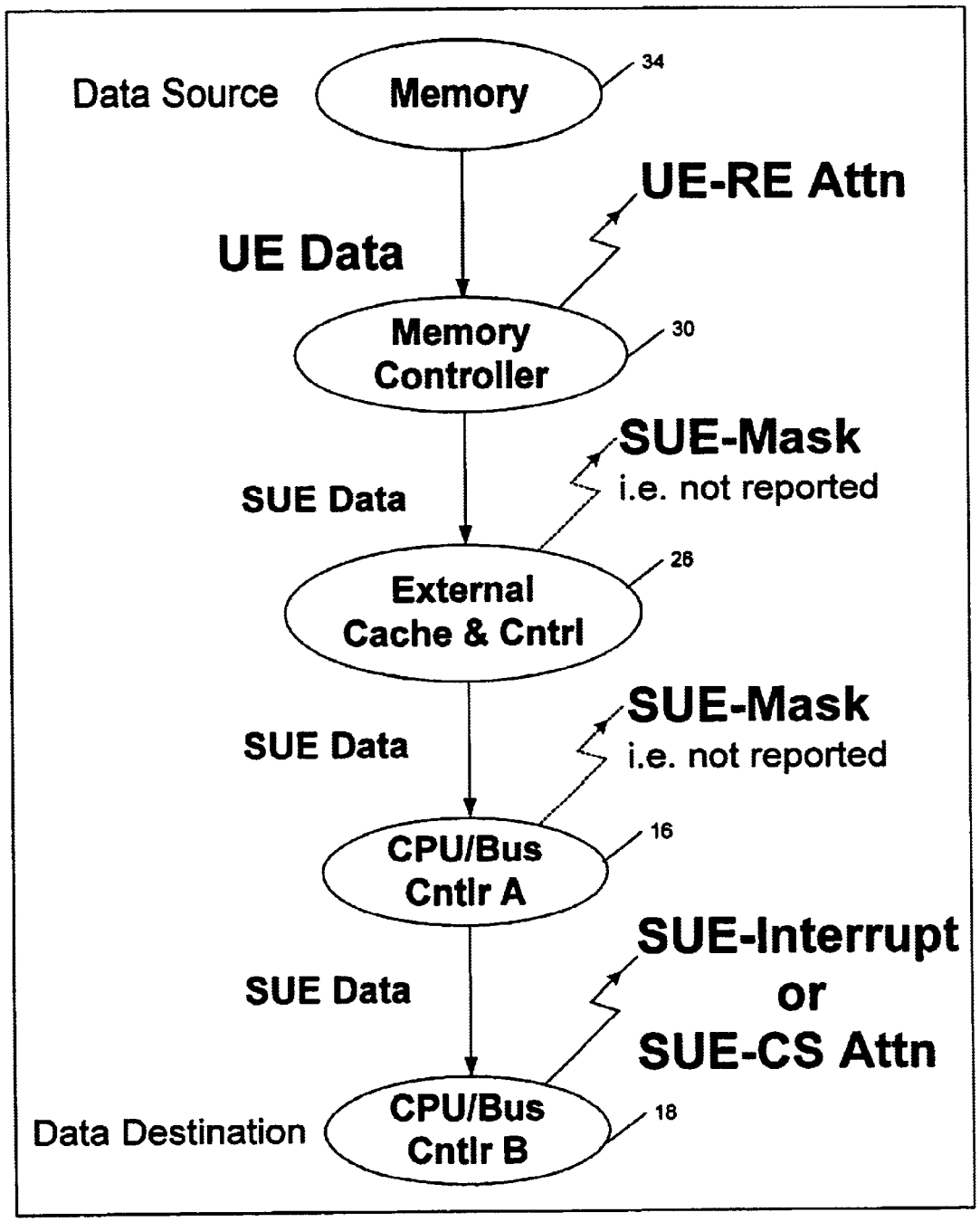
FIG. 3 illustrates an example of a flow chart of an uncorrectable data error (UE) condition on data coming from the memory.

FIG. 3 illustrates an example of a flow chart of an uncorrectable data error (UE) condition on data coming from memory 34. In this example, the CPU/bus controller 18 requests data from memory 34 and the Memory Controller 30 observes a UE-RE on data coming from the memory 34. The CPU/bus controller 16 and the L3 cache/controller 26 both provide an SUE-mask condition which is not reported because they are merely observing the condition.

The CPU/bus controller 18 (which requested the data) signals an interrupt upon its first attempt to use the incoming SUE condition tagged data. It is the responsibility of a system's firmware machine check interrupt handler (not shown) to process that interrupt. In the course of processing this interrupt, the CPU/bus controller 18 may encounter another instance of a special uncorrectable error (SUE) data condition which occurred after the SUE condition currently being processed, which will cause the CPU/bus controller 18 to invoke a system checkstop mechanism (not shown) and will cause the CPU/bus controller 18 to assert a SUE-CS attention to signal the service processor runtime diagnostic code (PRD) 62 to process the error appropriately. In this example, data with error flows in the system, the data is classified at various observation points as it flows through the system, and in two places (the memory controller 30 and the CPU/bus controller 18) an attention signal is asserted to the service processor. The PRD 62 acts on these attention signals.

Figure 4:
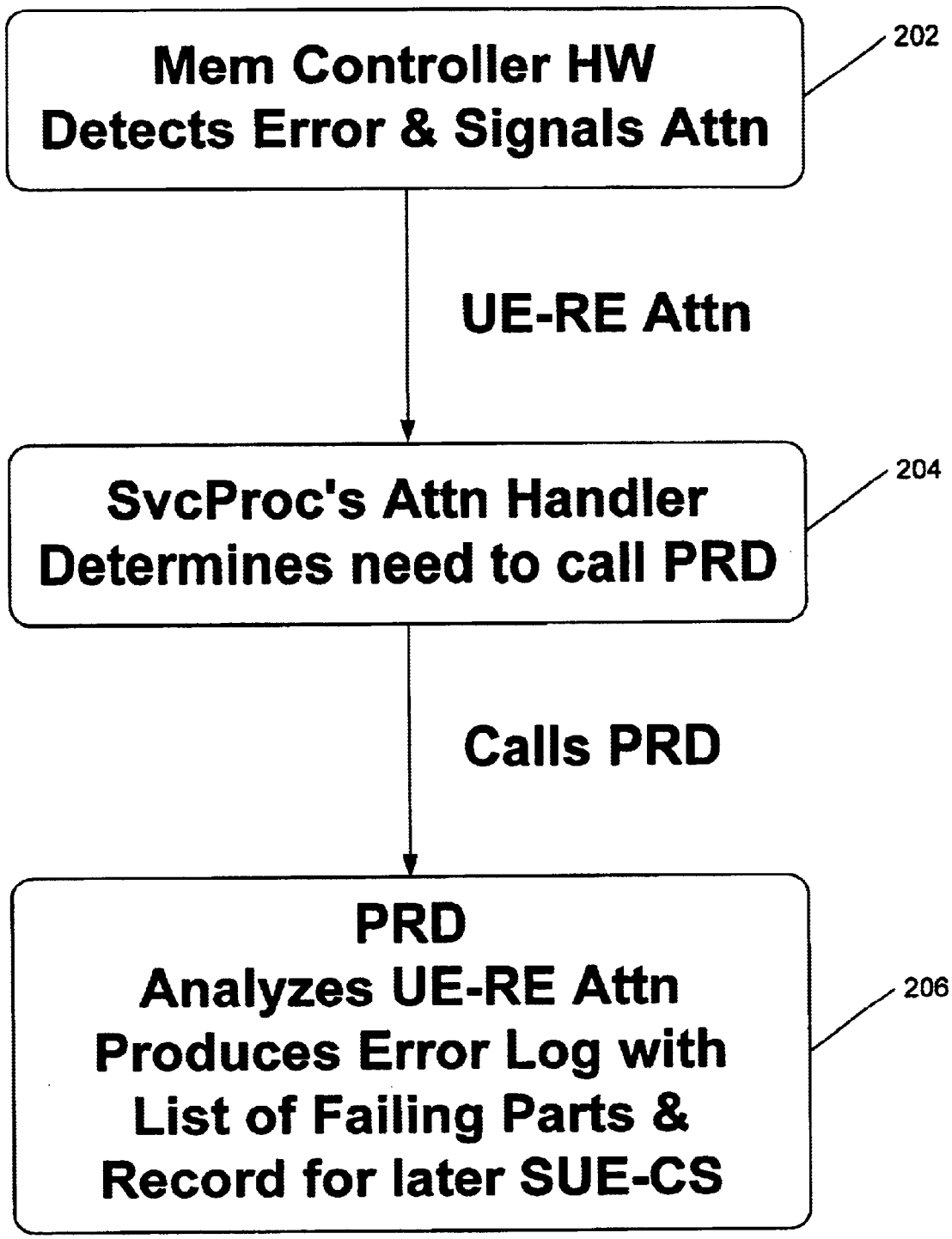
FIG. 4 is a flow chart illustrating how the PRD acts on each reported instance of a UE-RE condition.

FIG. 4 is a flow chart illustrating how the PRD 62 acts on each reported instance of a UE-RE condition. As is seen, the memory controller 30 detects a UE condition and provides an attention signal (UE-RE), via step 202. The attention handler determines that there is a need to call the PRD 62, via step 204. Finally, the PRD 62 analyzes the UE-RE attention signal and produces an error log with a list of failing parts and a record for diagnosing any later SUE-CS condition that may occur, via step 206.

The PRD 62 provides two significant advantages over conventional PRD processing. The first advantage is that using conventional PRD processing, the initial detection of a UE condition would have crashed the system. Secondly, the PRD 62 would not have had any reason to make a special record of the error for purposes of a subsequent SUE-CS condition because the system had crashed.

The system can usually recover from the UE-RE condition without experiencing a SUE-CS condition. Such recovery comes by virtue of the CPU/bus controller 18 not trying to utilize the corrupted data, or by virtue of the system's firmware machine check interrupt handler (not shown) being able to complete its error processing of initial error condition before the CPU/bus controller 18's hardware experiences another incoming SUE condition. If such a subsequent SUE condition comes in while such a recovery is being attempted, an SUE-CS attention signal will be asserted by the CPU/bus controller 18 device and the system will crash.

Figure 5:
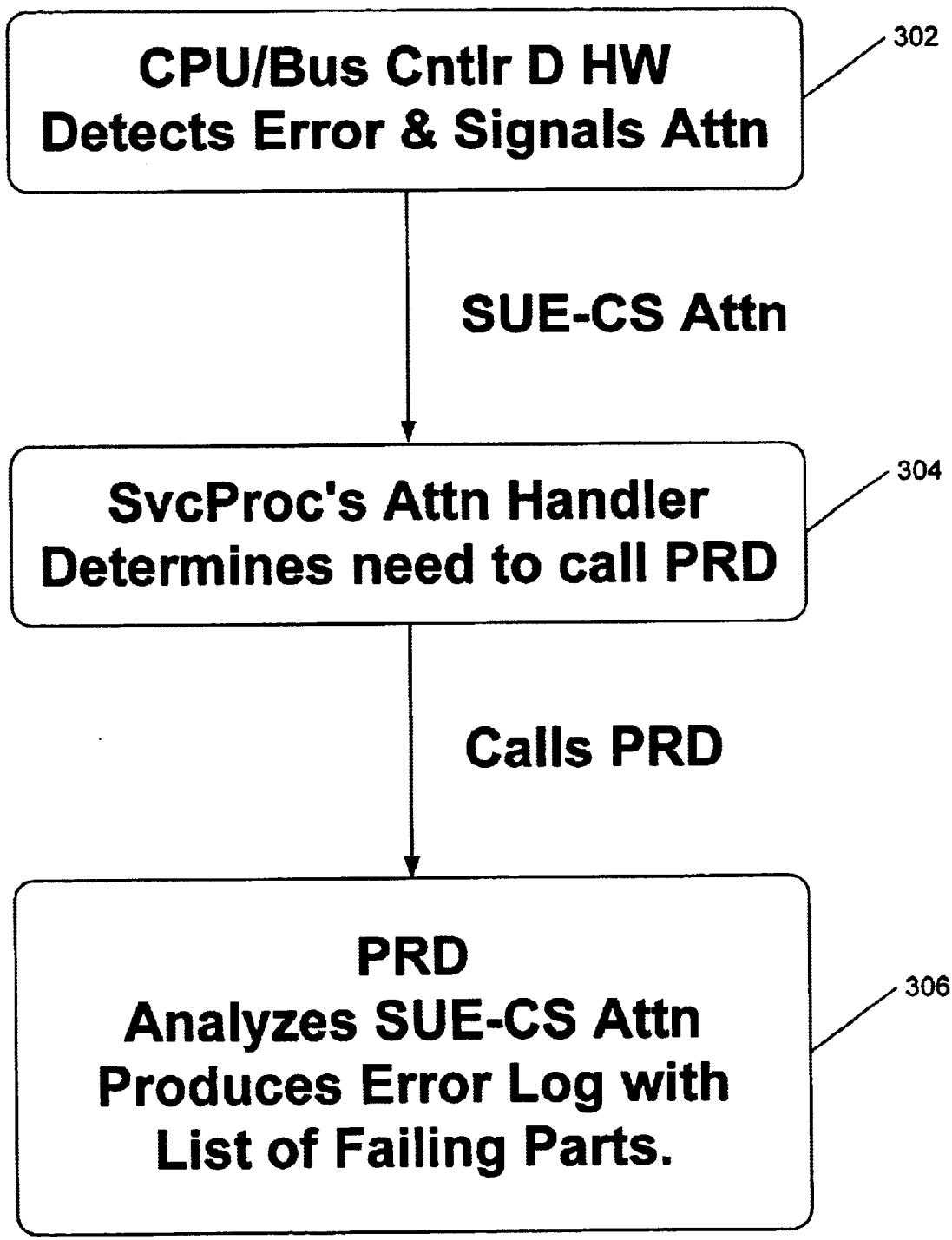
FIG. 5 is a flow chart illustrating how the PRD acts on a reported instance of an SUE-CS condition.

The PRD 62 gets called to process this error case as illustrated in FIG. 5. As is seen, the CPU/bus controller 18 detects an SUE condition and provides an SUE-CS attention signal, via step 302. The attention handler determines that there is a need to call the PRD 62, via step 304. Finally, the PRD 62 analyzes the SUE-CS attention signal and produces an error log with a list of failing parts, via step 306.

The flow chart of FIG. 5 seems nearly identical to that of FIG. 4. There is an important difference in the detection of a SUE-CS condition as opposed to the detection of a UE-RE condition, however. A UE-RE condition is detected at and reported by the CEC device (e.g., the memory controller in the above example) which first observes the error. That device is capable of capturing sufficient data for the PRD 62 to determine source of error because it is the first device that encounters the UE condition.

A SUE-CS condition, on the other hand, is detected and reported by a CEC device which can be far removed both physically and in terms of time from the actual source of the error. In general, such a device is not capable of capturing the error details necessary for the PRD 62 to determine cause. In some cases, a SUE-CS condition also can occur so quickly that there is insufficient time for the PRD 62 to process the prior UE-RE condition before the SUE-CS attention occurs. Accordingly, the PRD 62 handles these cases by processing the UE-RE condition at the same time as the subsequent SUE-CS.

Figure 6:
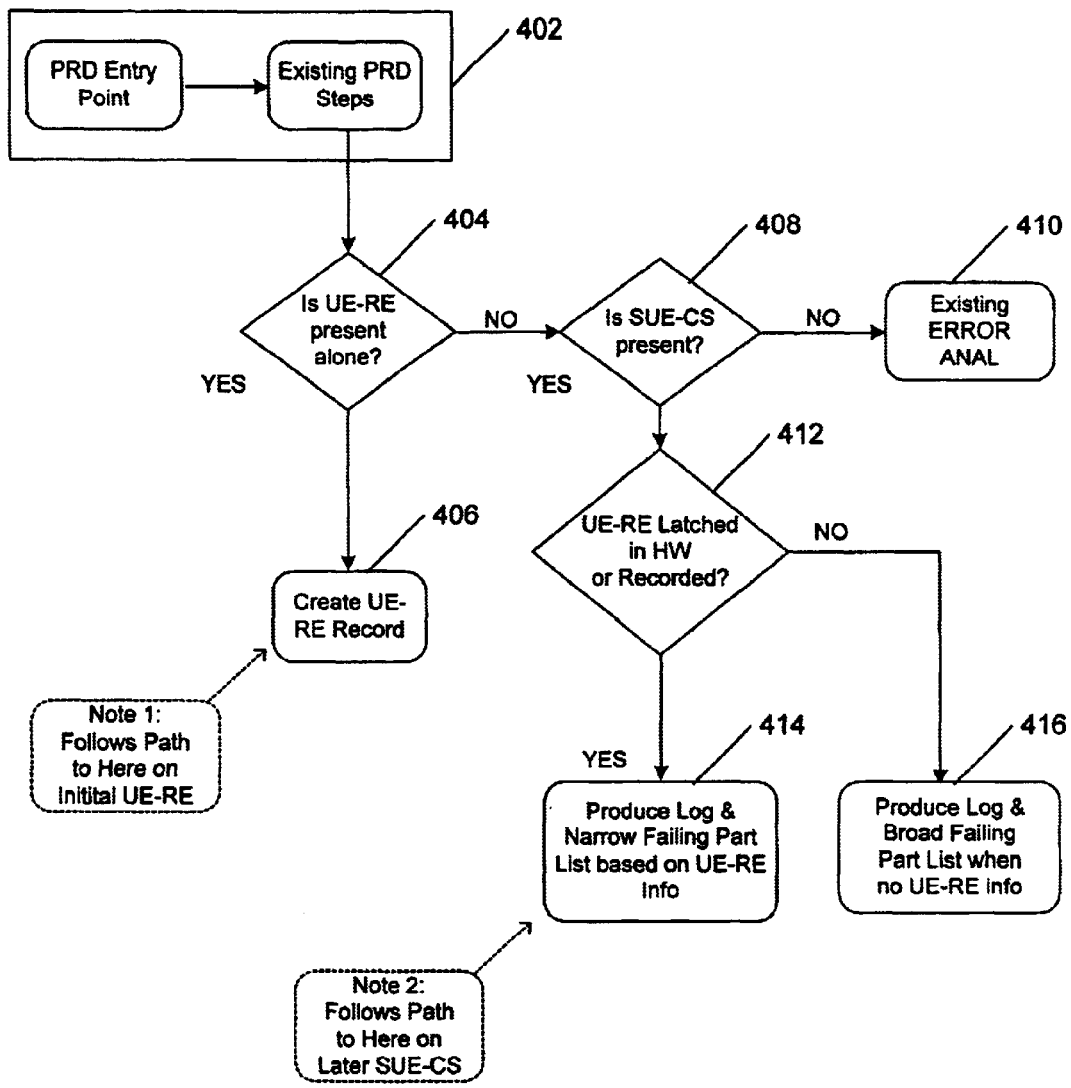
FIG. 6 is a flow chart illustrating the operation of the PRD when the UE-RE condition and the subsequent SUE-CS condition are processed either consecutively or at the same time.

FIG. 6 is a flow chart illustrating the operation of the PRD 62 when the UE-RE condition and the subsequent SUE-CS condition are processed either consecutively or at the same time. Referring now to FIG. 6, after the PRD-62 has been initiated via step 402, it is determined if a UE-RE condition is present alone, via step 404. That is determined if a UE-RE condition is present and no SUE-CS has occurred. If this condition is satisfied, a UE-RE record is created, via step 406. If, on the other hand, this condition has not been satisfied, then it is determined if a SUE-CS condition is detected, via step 408. If a SUE-CS condition is not detected, then an existing error analysis is performed, via step 410.

On the other hand, if a SUE-CS condition is detected, it is then determined whether a previous UE-RE is either recorded or isolated in a hardware CEC device, via step 412. If the answer is yes, then a log is produced in the PRD-62 and a narrow failing part list is produced based on the UE-RE information, via step 414. If there is no previous UE-RE condition, then a log is produced and a broad failing parts list is produced based on there being no UE-RE information, via step 416.

Figure 7:
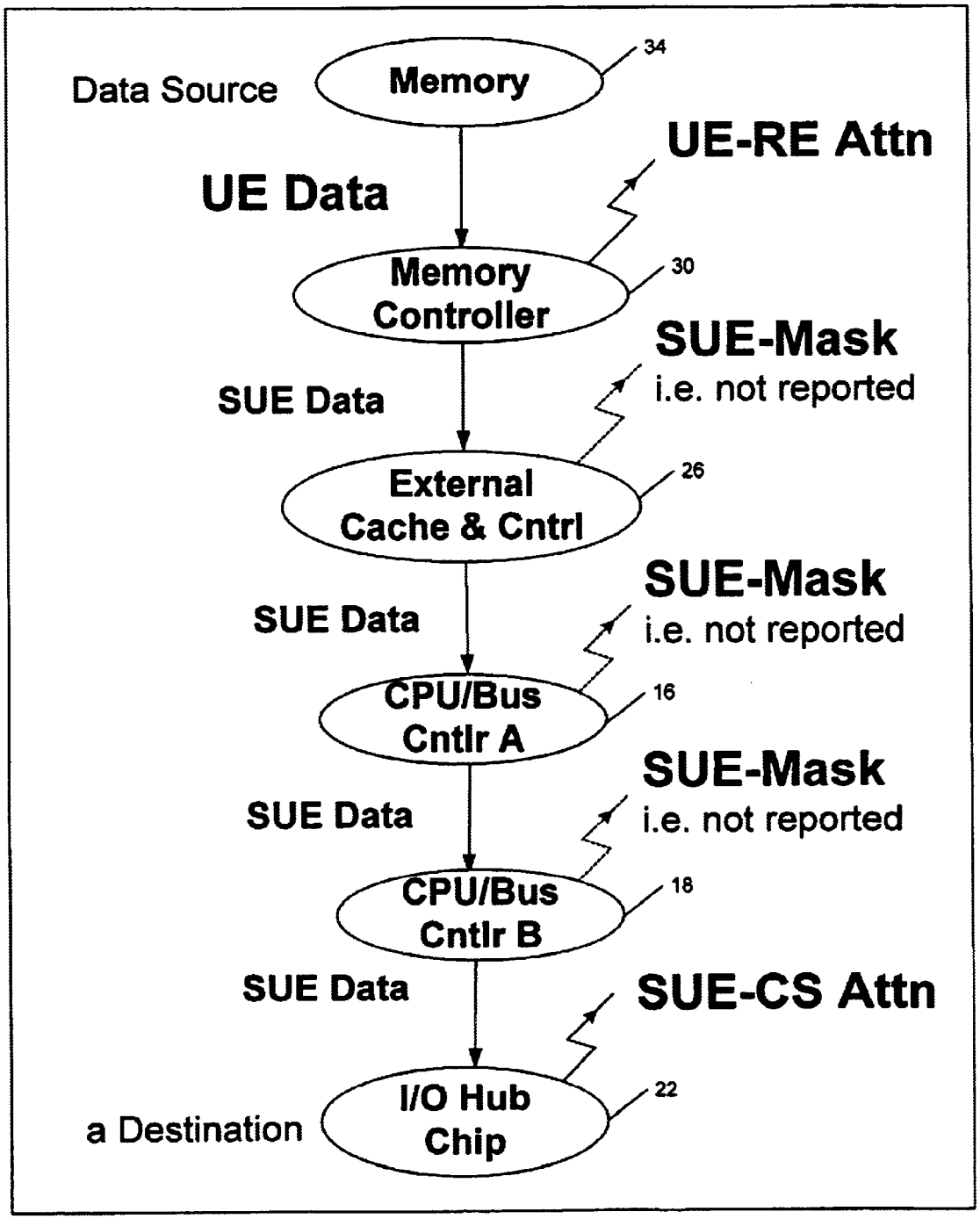
FIG. 7 is a flow chart illustrating the example where an I/O hub device connected to the CPU/bus controller requests data from memory and the memory controller observes an uncorrectable data error on data coming out of memory.

FIG. 7 is a flow chart illustrating the example where an I/O Hub device 22 connected to the CPU/bus controller 18 requests data from memory and the Memory Controller 30 observes a UE condition on data coming out of memory 34.

As illustrated by the Figure, control into and within the PRD 62 works the same for this example as for the above-identified example. This example, therefore, illustrates the versatility of the PRD 62 to handle all "UE error source destination" for the data paths contained within the CEC 10.

Variations of the above examples are possible and handled in the same fashion. They all have two common characteristics. The first common characteristic is that the original uncorrectable data error begins at some point where a CEC device detects and reports the UE-RE attention signal. This detection point can be in any memory controller device, any cache controller device, any CPU/Bus Controller, and any I/O Hub. The second common characteristic is that either (a) a CPU (can be any one of them) tries to use that error data, or (b) an attempt is made to route that data out to the I/O through any I/O Hub. Case (b) always leads to a SUE-CS condition, while case (a) may or may not lead to an SUE-CS condition as described previously.

Accordingly, a method and system in accordance with the present invention provides a methodology which extends the current capability of the PRD. The method and system in accordance with the present invention provides for correctly isolating UEs and providing appropriate service action messages on the system that has successfully recovered from the UE conditions. The method and system therefore allows for the accurate determination of an error source and the appropriate service action whether or not the system fails to recover from a particular UE condition. Accordingly, the PRD always determines the source of error if the error is based on an UE-RE even when the system continues to operate. If a SUE-CS occurs, the PRD will still correctly resolve the cause of the fault.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing an uncorrectable data error (UE), wherein the UE can produce any of the following condition: a UE-RE condition, an SUE-mask condition, SUE interrupt condition, and a SUE-CS condition, as the UE passes through a plurality of devices in a central electronic complex (CEC), the method comprises:

(a) detecting a UE-RE by at least one device in the CEC;
   (b) providing an attention signal by at least one device to a diagnostic system to indicate the UE-RE condition; and
   (c) analyzing the UE-RE attention signal by the diagnostic system to produce an error log with a list of failing parts and a record of the log.

2. The method of claim 1 wherein the SUE-mask condition does not need to be reported.

3. The method of claim 1 wherein detecting (a) comprises:

(a1) detecting a UE-RE condition by a first device; and
   (a2) detecting a special uncorrectable data error (SUE) condition by at least one other device at a later point in time, wherein the detection of the UE-RE condition by the first device produces a UE-RE condition and the detection of the SUE condition by the at least one other device produces a SUE-CS condition, wherein the UE-RE condition and the SUE-CS condition are processed at substantially the same time.

4. The method of claim 1 wherein the diagnostic system comprises a processor runtime diagnostic (PRD) code.

5. The method of claim 4 wherein the PRD code is within a service processor.

6. The method of claim 5 wherein the PRD accesses each of the plurality of devices through an interface within the service processor.

7. The method of claim 6 wherein the interface comprises a JTAG interface.

8. A computer readable medium containing program instructions for managing an uncorrectable data error (UE), wherein the UE can produce any of the following conditions: a UE-RE condition; an SUE-mask condition; SUE interrupt condition; and a SUE-CS condition, as the UE passes through a plurality of devices in a central electronic complex (CEC), the program instructions for:
(a) detecting a UE-RE by at least one device in the CEC;
(b) providing an attention signal by at least one device to a diagnostic system to indicate the UE-RE condition; and
(c) analyzing the UE-RE attention signal by the diagnostic system to produce an error log with a list of failing parts and a record of the log.

9. The computer readable medium of claim 8 wherein the SUE-mask condition does not need to be reported.

10. The computer readable medium of claim 8 wherein detecting (a) comprises:
(a1) detecting a UE-RE condition by a first device; and
(a2) detecting a special uncorrectable data error condition (SUE) condition by at least one other device at a later point in time, wherein the detection of the UE-RE condition by the first device produces a UE-RE condition and the detection of the SUE by the at least one other device produces a SUE-CS condition, wherein the UE-RE condition and the SUE-CS condition are processed at substantially the same time.

11. The computer readable medium of claim 8 wherein the diagnostic system comprises a processor runtime diagnostic (PRD) code.

12. The computer readable medium of claim 11 where in the PRD code is within a service processor.

13. The computer readable medium of claim 12 wherein the PRD accesses each of the plurality of devices through an interface within the service processor.

14. The computer readable medium of claim 13 wherein the interface comprises a JTAG interface.

15. A service processor for managing an uncorrectable data error (UE), wherein the UE can produce any of the following condition: a UE-RE condition, an SUE-mask condition, SUE interrupt condition, a SUE-RE condition, and a SUE-CS condition, as the UE passes through a plurality of devices in a central electronic complex (CEC), the service processor comprises:
an attention handler for detecting a UE-RE by at least one device in the CEC and providing an attention signal by at least one device system to indicate the UE-RE condition; and
a diagnostic system for receiving the attention signal and for analyzing the UE-RE attention signal to produce an error log with a list of falling parts and a record of the log.

16. The service processor of claim 15 wherein the SUE-mask condition does not need to be reported.

17. The service processor of claim 15 wherein the attention handler detects a UE-RE condition by a first device, and detects a special uncorrectable data error (SUE) condition by at least one other device at a later point in time, wherein the SUE-RE condition and the SUE-CS conditions are processed at substantially the same time.

18. The service processor of claim 15 wherein the diagnostic system comprises a processor runtime diagnostic (PRD) code.

19. The service processor of claim 18 wherein the PRD accesses each of the plurality of devices through an interface within the service processor.

20. The service processor of claim 19 wherein the interface comprises a JTAG interface.

21. A method for managing an uncorrectable data error (UE) as the UE passes through a plurality of devices in a central electronic complex (CEC), the method comprises:
(a) detecting a UE-RE condition by at least one device in the CEC wherein the detecting step (a) comprises the steps of: (a1) detecting a UE-RE condition by a first device; and (a2) detecting a special uncorrectable data error (SUE) condition by the at least one other device at a later point in time, wherein the detection of the UE-RE condition by the first device produces a UE-RE condition and the detection of the SUE condition by the at least one other device produces a SUE-CS condition, wherein the UE-RE condition and the SUE-CS conditions are processed at substantially the same time;
(b) providing an attention signal by at least one device to a processor runtime diagnostic (PRD) code to indicate the UE-RE condition, wherein the PRD accesses each of the plurality of devices through an interface within the service processor; and
(c) analyzing the UE-RE attention signal by the diagnostic system to produce an error log with a list of failing parts and a record of the log.

22. The method of claim 21 wherein the UE can produce any of the following conditions: a UE-RE condition; an SUE-mask condition; SUE interrupt condition; a SUE-RE condition and a SUE-CS condition.

23. The method of claim 22 wherein the SUE-mask condition does not need to be reported.

24. The method of claim 23 wherein the PRD code is within a service processor.

25. The method of claim 24 wherein the interface comprises a JTAG interface.

26. A computer readable medium containing program instructions for managing an uncorrectable data error (UE) as the UE passes through a plurality of devices in a central electronic complex (CEC), the program instructions for:
(a) detecting a UE-RE condition by at least one device in the CEC wherein the detecting step (a) comprises the steps of: (a1) detecting a UE-RE condition by a first device; and (a2) detecting a special uncorrectable data error (SUE) condition by the at least one other device at a later point in time, wherein the detection of the UE-RE condition by the first device produces a UE-RE condition and the detection of the SUE condition by the at least one other device produces a SUE-CS condition, wherein the UE-RE condition and the SUE-CS conditions are processed at substantially the same time;
(b) providing an attention signal by at least one device to a processor runtime diagnostic (PRD) code to indicate the UE-RE condition, wherein the PRD accesses each of the plurality of devices through an interface within the service processor; and
(c) analyzing the UE-RE attention signal by the diagnostic system to produce an error log with a list of failing parts and a record of the log.

27. The computer readable medium of claim 26 wherein the UE can produce any of the following conditions: a UE-RE condition; an SUE-mask condition; SUE interrupt condition; and a SUE-CS condition.

28. The computer readable medium of claim 27 wherein the SUE-mask condition does not need to be reported.

29. The computer readable medium of claim 28 wherein the PRD code is within a service processor.

30. The computer readable medium of claim 29 wherein the interface comprises a JTAG interface.

31. A service processor for managing an uncorrectable data error (UE) as the UE passes through a plurality of devices in a central electronic complex (CEC), the service processor comprises:

an attention handler for detecting a UE-RE by at least one device in the CEC and providing an attention signal by at least one device system to indicate the UE-RE condition, wherein the attention handler detects a UE-RE condition by a first device, and detects a special uncorrectable data error (SUE) condition by at least one other device at a later point in time, wherein the SUE-RE condition and the SUE-CS conditions are processed at substantially the same time; and a processor runtime diagnostic (PRD) code for receiving the attention signal and for analyzing the UE-RE attention signal to produce an error log with a list of failing parts and a record of the log, wherein the PRD accesses each of the plurality of devices through an interface within the service processor.

32. The service processor of claim 31 wherein the UE can produce any of the following conditions: a UE-RE condition; an SUE-mask condition; SUE interrupt condition, a SUE-RE condition and a SUE-CS condition.

33. The service processor of claim 32 wherein the SUE-mask condition does not need to be reported.

34. The service processor of claim 33 wherein the interface comprises a JTAG interface.

35. A method for managing an uncorrectable data error (UE) as the UE passes through a plurality of devices in a central electronic complex (CEC), the method comprises:

(a) detecting a UE-RE by at least one device in the CEC, wherein the UE can produce any of the following conditions: a UE-RE condition; an SUE-mask condition; SUE interrupt condition; and a SUE-CS condition;

(b) providing an attention signal by at least one device to a diagnostic system to indicate the UE-RE condition; and (c) analyzing the UE-RE attention signal by the diagnostic system to produce an error log with a list of failing parts and a record of the log.

36. A computer readable medium containing program instructions for managing an uncorrectable data error (UE) as the UE passes through a plurality of devices in a central electronic complex (CEC), the program instructions for:

(a) detecting a UE-RE by at least one device in the CEC, wherein the UE can produce any of the following conditions: a UE-RE condition; an SUE-mask condition; SUE interrupt condition; and a SUE-CS condition;

(b) providing an attention signal by at least one device to a diagnostic system to indicate the UE-RE condition; and (c) analyzing the UE-RE attention signal by the diagnostic system to produce an error log with a list of failing parts and a record of the log.

37. A service processor for managing an uncorrectable data error UE) as the UE passes through a plurality of devices in a central electronic complex (CEC), the service processor comprises:

an attention handler for detecting a UE-RE by at least one device in the CEC and providing an attention signal by at least one device system to indicate the UE-RE condition, wherein the UE can produce any of the following conditions: a UE-RE condition; an SUE-mask condition; SUE interrupt condition, a SUE-RE condition and a SUE-CS condition; and a diagnostic system for receiving the attention signal and for analyzing the UE-RE attention signal to produce an error log with a list of failing parts and a record of the log.

* * * * *

UNITED STATES PATENT AND TRADEMARK OFFICE
CERTIFICATE OF CORRECTION

PATENT NO. : 6,845,469 B2  Page 1 of 1
APPLICATION NO. : 09/820461
DATED : January 18, 2005
INVENTOR(S) : Hicks et al.

It is certified that error appears in the above-identified patent and that said Letters Patent is hereby corrected as shown below:

In column 7, line 62, remove "falling" and replace with --failing--.

In column 10, line 26, add --(-- after "error" and before "UE)".

Signed and Sealed this

Eighth Day of January, 2008

JON W. DUDAS
*Director of the United States Patent and Trademark Office*